(12) United States Patent
Bohly

(10) Patent No.: US 10,262,480 B2
(45) Date of Patent: Apr. 16, 2019

(54) METHOD FOR MANAGING ACCESS RIGHTS OF A USER TO A PLACE

(71) Applicant: PARKEON, Paris (FR)

(72) Inventor: Michel Bohly, Montrond-le-Chateau (FR)

(73) Assignee: PARKEON, Paris (FR)

( * ) Notice: Subject to any disclaimer, the term of this patent is extended or adjusted under 35 U.S.C. 154(b) by 0 days.

(21) Appl. No.: 15/180,279

(22) Filed: Jun. 13, 2016

(65) Prior Publication Data

US 2016/0364926 A1  Dec. 15, 2016

(30) Foreign Application Priority Data

Jun. 12, 2015 (FR) ..................................... 15 55383

(51) Int. Cl.
*G07C 9/00* (2006.01)
*G06F 21/34* (2013.01)
*G06F 21/60* (2013.01)
*H04L 29/06* (2006.01)

(52) U.S. Cl.
CPC .......... *G07C 9/00111* (2013.01); *G06F 21/34* (2013.01); *G06F 21/604* (2013.01); *H04L 63/0853* (2013.01); *H04L 63/10* (2013.01); *H04L 69/18* (2013.01); *G07C 2209/10* (2013.01)

(58) Field of Classification Search
CPC ... G07C 9/00111; G06F 21/34; G06F 21/604; H04L 63/0853; H04L 69/18
USPC ........................................................ 340/5.22
See application file for complete search history.

(56) References Cited

U.S. PATENT DOCUMENTS

| 2005/0268330 | A1* | 12/2005 | Di Rienzo | ................ G01S 5/14 |
| | | | | 726/4 |
| 2007/0160042 | A1* | 7/2007 | Dollo | .................... H04L 49/602 |
| | | | | 370/389 |
| 2010/0029200 | A1* | 2/2010 | Varriale | .................. G06F 21/34 |
| | | | | 455/41.1 |
| 2010/0228982 | A1* | 9/2010 | Zhu | ....................... H04L 9/3271 |
| | | | | 713/175 |

(Continued)

FOREIGN PATENT DOCUMENTS

| WO | 01/42904 A1 | 6/2001 |
| WO | 2012/163987 A1 | 12/2012 |

OTHER PUBLICATIONS

French Search Report, dated Jan. 8, 2016, from corresponding French Application.

(Continued)

*Primary Examiner* — Omar Casillashernandez
(74) *Attorney, Agent, or Firm* — Young & Thompson

(57) ABSTRACT

A method for managing access rights of a user (10) to one place, the method being applied by an automaton (20), inter alia by a time-stamp meter, the automaton (20) including a readout unit (22, 26) and the method including the steps:
  presenting to the readout member (22, 26) a physical identification medium (14),
  sending at least one message for requesting provision of the identification code by the readout unit (22, 26) to the physical medium (14), each message being a message intended to be addressed to the first layer (C1) according to a different communication protocol,
  when the readout unit (22, 26) receives a response from the physical medium (14), receiving the identification code.

9 Claims, 1 Drawing Sheet

(56) References Cited

U.S. PATENT DOCUMENTS

| | | | |
|---|---|---|---|
| 2011/0057815 A1* | 3/2011 | King | G07B 15/02 340/932.2 |
| 2011/0258452 A1* | 10/2011 | Coulier | G06F 21/31 713/171 |
| 2012/0209666 A1* | 8/2012 | Debac | G07B 15/02 705/13 |
| 2012/0221860 A1* | 8/2012 | Hoornaert | G06F 21/34 713/172 |
| 2013/0191191 A1 | 7/2013 | Silvani et al. | |
| 2015/0033275 A1* | 1/2015 | Natani | H04N 21/42225 725/110 |
| 2015/0261948 A1* | 9/2015 | Marra | G06F 21/34 726/4 |
| 2016/0026596 A1* | 1/2016 | Klein | G06F 13/4221 710/313 |

OTHER PUBLICATIONS

Anonymous: "Proximity card—from Wikipedia, the free encyclopedia", Jun. 7, 2015, (Jun. 7, 2015), XP05523591, URL: https://en.wikipedia.org/w/index.php?title=Proximity_card&oldid=665886233.

* cited by examiner

METHOD FOR MANAGING ACCESS RIGHTS OF A USER TO A PLACE

FIELD OF THE INVENTION

The present invention relates to a method for managing access rights of a user to a place. The invention also relates to an automaton, a management system and to a computer program product associated therewith.

BACKGROUND OF THE INVENTION

Generally, the access rights of a user to a place are managed by the use of a specific badge. Such a badge is described as a single-service specific card.

However, this imposes management of such specific badges as well as management of the distribution logistics, the renewal, the replacement resulting from losses or from theft. The responsibility of the manager is also implied for the possible residual sums of electronic money in the case of failure of the badge.

Further, for the user, the multiplication of the number of badges induces an increase in the previous risks, notably loss or theft.

For this, it is desirable to limit the number of implied badges in the management of the access rights of the user to one or several places.

Private cards accumulating several functions are known. Thus, there exist electrically customized cards for storing in memory application data which only the receivers having an adapted piece of software are capable of addressing.

However, the use of such privative cards implies a specific software development for accepting each card.

So-called "multi-applications" cards are also known. Such cards have dedicated regions and each application only accesses a region of the card which is reserved for the relevant application. As an example, mention may be made of student Moneo cards in France for example, which students may use for paying their parking fee or for accessing the services of the CROUS (university restaurant or library notably).

Nevertheless, accepting all so-called "multi-application" cards implies specific software development on the acceptance point, from the knowledge of application data of the card.

SUMMARY OF THE INVENTION

There exist a need for a method for managing the access rights of a user to a place giving the possibility of limiting the number of implied badges and which is more easy to apply.

For this, a method for managing access rights of the user to a place is proposed, the method being applied by an automaton, inter alia by a time-stamp meter, the automaton including a read-out unit and the method including steps for presenting to the readout unit a physical identification medium, the physical medium including first data and second data, the first data corresponding to a first layer and the second data to a second layer, the first layer being a layer of a lower level than the second layer, the first data including an identification code, the sending of at least one message for requesting provision of an identification code by the readout unit to the physical medium, each message being a message intended to be addressed to the first layer according to a different communication protocol, and when the readout unit receives a response from the physical medium, reception of the identification code.

According to particular embodiments, the method comprises one or several of the following features, taken individually or according to all the technically possible combinations:

the sending step is iterative, a next message being sent according to a communications protocol not used previously when none of the messages sent previously has received any response from the physical medium.

the sending step includes the use of a number greater than or equal to 5 of different communication protocols, preferably greater than or equal to 10 different communication protocols and still preferably greater than or equal to 15 different communication protocols.

each message includes two portions, the second portion being redundant with the first portion, both portions asking the physical support what is the identification code.

the method includes the rejection of the physical medium when no response from the physical medium is received by the readout unit.

the automaton includes a controller and the method further includes steps for transmitting the identification code from the readout unit to a controller, the sending of the identification code by the controller to a central server for recovering access data of the user to the place, and sending of the access data from the central server to the controller.

An automaton is also proposed, inter alia a time-stamp meter, including a readout unit capable of sending at least one message when an identification physical medium is presented to the readout member, the physical medium including firsts data and second data, the firsts data corresponding to a first layer and the second data to a second layer, the first layer being a layer with a lower level than the second layer, the first data including an identification code, each message being a message for requesting provision of the identification code to the physical medium, each message being a message intended to be addressed to the first layer according to a different communications protocol for the level of the first layer, and receiving the identification code when the readout unit receives a response from the physical medium.

A management system is also proposed, including a central server capable of communicating with the automaton, and an automaton as described earlier, the automaton including a controller capable of receiving the identification code from the readout unit and of sending the identification code through the controller to a central server for recovering the access data of the user to the place.

A computer program product is also proposed, including a legible information medium, on which a computer program is stored in memory comprising program instructions, the computer program being loadable on a data processing unit and adapted for causing the application of the method as described earlier when the computer program is applied on the data processing unit.

BRIEF DESCRIPTION OF THE DRAWINGS

Other features and advantages of the invention will become apparent upon reading the description which follows of embodiments of the invention, only given as an example and with reference to the drawings wherein.

DETAILED DESCRIPTION OF THE INVENTION

Figure 1:
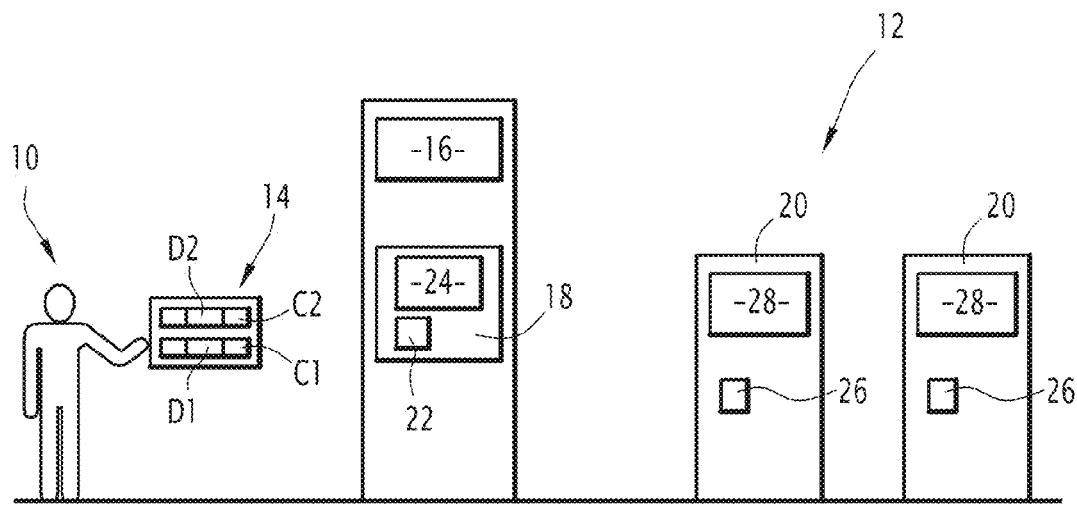
FIG. 1 is a schematic illustration of a management system.

A user 10 and a management system 12 are illustrated in FIG. 1.

The user 10 seeks to access a place, the access of which is regulated by the management system 12.

The user 10 has an identification physical medium 14, simply noted as a physical medium 14 in the following.

According to a first representation illustrated by FIG. 1, the physical medium 14 includes first data D1 and second data D2.

The first data D1 correspond to a first layer C1 and the second data D2 correspond to a second layer C2.

The first data D1 include an identification code Cld. The identification code Cld is specific to the physical medium 14. There exists a one-to-one relationship between the identification code Cld and the physical media 12. Thus, the identification code Cld ensures the uniqueness of the physical medium 12 with which the identification code Cld is associated.

Depending on the cases, the identification code Cld is of a different nature.

Notably, according to a particular embodiment, the identification code Cld is in the form of a barcode. A barcode or code with bars is the illustration of a numerical or alphanumerical datum in the form of a symbol consisting of bars and spaces, the thickness of which varies according to the symbology used and to the thereby coded data.

The second data D2 are different applications for example giving the possibility of accessing personal data of the user.

The first layer C1 is a layer of a lower level than the second layer C2. Indeed, the first layer C1 is at the lowest level while the second layer C2 is an application layer.

According to a second representation, the physical medium 14 includes a memory, a communication interface and a set of software packages.

The memory is capable of storing in memory the first data D1.

The communication interface is able to handle the communications with an outer element. Access to the memory or to a software package of the set of software packages is accomplished by means of the communication interface.

The set of software packages corresponds to the second data D2.

According to a third representation, the physical medium 14 includes two portions, an intrinsic portion and an extrinsic portion.

The intrinsic portion operates without applying dedicated software packages on the basis of a specific communication protocol. Consequently, the intrinsic portion is compatible with any platform capable of exchanging messages in the specific communication protocol. In this case, the intrinsic portion includes the first data D1.

The extrinsic portion operates by applying at least one dedicated software package. The extrinsic portion is able to collaborate with an outer element for applying the software package. Consequently, the application of the software package only takes place if the outer element is compatible with the application of the software package, which at least assumes that it is possible to exchange messages in the specific communication protocol. In the general case, however, the exchange of messages in the specific communication protocol is an insufficient property for guaranteeing the application of the software package.

In all the previous representations, it should be noted that the physical medium 14 gives the possibility of either being identified or storing personal data in memory.

Further, the physical medium 14 uses a standardized low level communication protocol related to the technology which the physical medium applies.

According to such a communication protocol, the physical medium 14 returns to the receiver intended to detect it, generic information including the unique identification code Cld of the physical medium 14. Such a piece of information is provided without applying an application datum of the physical medium 14. The communication protocol is independent of any application datum.

In the following, as an example, the first representation is preferred.

An illustration of a physical medium 14 is a badge.

According to a particular case, the physical medium 14 is a badge for accessing the company of the user.

Alternatively, the physical medium 14 is a card for controlling the access barriers to private condominiums.

According to another example, the physical medium 14 is a card for registration of the borrowing of books from a municipal library of the user.

According to still another illustration, the physical medium 14 is a badge for the cafeteria.

Other examples may also be contemplated such as the social insurance card or a biometric passport.

In the following, an illustration with a transportation card is preferred. Of the Calypso type such as the «pass Navigo®» in Paris, the card «KorriGo®» in Brittany, or the card «Oura®» in Rhone-Alpes, the card «Pass-Pass®» in Lille are examples of everyday or transportation cards.

As an illustration, the transportation cards used in different regions of the world use a so-called contactless MIFARE protocol. MIFARE is based (partly or completely depending on the versions) on one of the ISO standards describing contactless chip cards: ISO 14443 of the Type A operating at 13.56 MHz. The «pass Navigo®» in Paris is based on a so-called Calypso protocol.

The management system 12 is able to manage access rights of the user to one place.

The management system 12 includes a central server 16, a registration member 18 and a set of automaton 20.

As an example, the central server 16 and the registration member 18 are positioned in offices for receiving the public of the city or those of the parking operator (ticket offices) or may be deployed as a remote service via the internet network.

The central server 16 is usually a computer.

The central server 16 is connected to each of the automaton 20 for communicating data with the automaton 20. More specifically, the central server 16 is capable of sending data to the automaton 20 and to receive data transmitted by the automaton 20.

The central server 16 has access to databases in which information relating to the user is stored in memory. The pieces of information relating to the user are associated with the identification code Cld of the physical medium 14 generally used by the user.

The registration member 18 includes a central readout unit 22 and a man/machine interface 24.

The registration member 18 is able to allow registration of the physical medium 14 as a right of access to the place.

The central readout unit 22 is capable of reading the identification code Cld of the physical medium 14 of the user.

The nature of the central readout unit 22 depends on the identification code Cld to be read.

For example, for a contactless card, the central readout unit 22 is a contactless antenna. For an identification code in the form of barcodes, the central readout unit 22 is a barcode reader.

According to an advantageous embodiment, the central readout unit 22 includes a plurality of sub-units, each sub-unit allowing identification of a particular type of identification code Cld to be read.

As an example, the central readout unit 22 includes five sub-units. The first sub-unit is a barcode reader. The second sub-unit is a contactless antenna. The third sub-unit is a contact chip card interface. The fourth sub-unit is capable of reading identification codes Cld producing a «radio-label». In such a case, the fourth sub-unit is capable of achieving radio-identification, most often designated by the RFID acronym (radio frequency identification) i.e. a method for storing in memory and recovering remote data by using markers called «radio-labels». The fifth unit is able to apply near field communication (NFC). Such a short range and high frequency wireless communication technology allows exchange of information between peripherals up to a distance of about 10 centimeters (cm). Such a technology is an extension of the ISO/IEC 14443 standard, standardizing proximity cards using radio-identification (RFID), which combine the interface of a chip card and a reader within a single peripheral.

The man/machine interface 24 is, according to the Example of FIG. 1, an interactive screen. The user 10 thus has the possibility of entering information into the central server. The man/machine interface 24 is also used for proceeding with payments.

The registration member 18 is also connected to the central server 16 so that the obtained data either by the central readout unit 24 or by the man/machine interface are written into the database of the central server 16.

In the particular case of FIG. 1, each of the automaton 20 are time-stamp meters. Only two time-stamp meters are illustrated in FIG. 1 for the sake of simplification.

In a way known per se, a time-stamp meter is an electro-mechanical device giving the possibility of paying for automobile parking rights. The time-stamp meter delivers a parking ticket, indicating the time and the date of payment of the parking rights, as well as the duration of the thereby paid right or the date and time of the end of the paid right. Other pieces of information may also appear on the parking ticket such as the area, the identification of the machine having issued the document or a single code allowing identification of counterfeited tickets. The motorist has to exhibit this documentary proof properly visible behind his/her windscreen.

It should be noted that there also exist time-stamp meters used with places numbered on the ground. Thus, the user inputs the number of his park space, pays for the desired period and does not have to return to his/her vehicle. In such a situation, the meter does not issue a parking ticket but an optional receipt.

Each automaton 20 also comprises a local readout unit 26 and a controller 28.

The same remarks as earlier for the central readout unit 24 apply for each local readout unit 26.

The controller 28 is connected to the readout unit 26 on the one hand and with the central server 16 on the other hand.

The controller 28 is notably capable of receiving data from the readout unit 26 and of exchanging data with the central server 16.

The operation of the management system 12 is described with reference to an example for applying a management method.

In the Example, it is assumed that the user lives in the city of Besançon and works in the applicant company.

The user drives to an office of the city or the desk of the parking operator.

The method includes a first step for presenting to the central readout unit 24 a physical medium 14. In this case, the user 10 presents as a physical medium 14 an applicant access badge.

The method then comprises a second step for sending at least one message for requesting provision of the identification code by the central readout unit 24 to the physical medium 14.

Each message is a message intended to be addressed to the first layer C1 according to a different communication protocol.

Preferably, each message includes two portions, the second portion being redundant with the first portion, both portions requesting the identification code to the physical medium 14.

This gives the possibility of guaranteeing that the message is not understood by the physical medium 14 because the communication protocol is not the communication protocol used by the physical medium 14.

In order to further improve this effect, according to a particular embodiment, each message includes more than two portions, for example three portions or four portions.

Advantageously, the second sending step is iterative, a next message being sent according to a communication protocol which was not used earlier when none of the messages sent previously has received any response from the physical medium 14.

According to a preferred embodiment, the second sending step includes the use of a number of more than or equal to 5 different communication protocols.

Preferably, the second sending step includes the use of a number of more than or equal to 10 different communication protocols.

Preferentially, the second sending step includes the use of a number of more than or equal to 15 different communication protocols.

At the end of the second sending step, two cases are possible.

In a first case, the central readout unit 24 receives a response from the physical medium 14, the method then includes a third step for receiving the identification code Cld.

In a second case, the method includes the rejection of the physical medium 14 when no response from the physical medium 14 is received by the central readout unit 24.

In this case, the second case applies. The identification member 16 recognizes a medium of the MIFARE type and recovers the unique number of the badge code over X characters. The identification member 16 does not know whether this is a badge of the applicant company. The identification member 16 only has access to the identifier of the physical medium 14.

Further, via the man/machine interface 22, the user 10 enters the identifiers of his/her vehicle. For example, the number of the registration plate is entered via the man/machine interface 22.

At the desk, a resident file is generated with the identification code CId and the entered data via the man/machine interface 22.

Upon parking of the vehicle of the user 10, the same first, second and third steps are iterated with an automaton 20. The only difference in this case is that instead of using the central readout unit 24, a local readout unit 26 is used.

Further, during the parking of the vehicle, the method also includes a fourth step for transmitting the identification code CId from the local readout unit 26 to the controller 28.

The method also includes a fifth step for sending the identification code CId through the controller 28 towards the central server 16 in order to recover access data of the user to the place.

The central server 16 then searches for the file corresponding to the user from the identifier, attributes the privileges/tariff rules, associated parking rights and sends them back to the automaton 20.

The method also includes a sixth step for sending access data from the central server 16 to the controller 28.

In the case of forgetting or losing the medium (a) used registered in the database by the motorist, for being identified, the user may directly input his/her registration plate number on the keyboard of the time-stamp meter for accessing his/her rights.

The management system 12 gives the possibility to cities/parking operators of doing without the management of specific media, the generation of applications, the distribution, renewal, replacement logistics following losses or theft and the responsibility of possible residual losses of electronic money in the case of failure of the medium.

The result of this is a reduction of costs.

Further, this gives the possibility of reducing the risks and the responsibility as compared with private cards which include a reserve of electronic money available for the parking. The media of the identifier are the property of the actual user 10.

Further, the proposed management system provides flexibility in the setting into place of the parking policy and of its payment, of the deployment of new privileges associated with a user profile.

The system is also facilitated for the user 10.

Indeed, the system gives the possibility of avoiding the multiplication of cards in the wallet of the user.

Further, it is no longer indispensable to retain the registration plate number for parking schemes based on this characteristic (Pay By Plate) or of having the papers of the vehicle with oneself.

Further, the user benefits from a gain in time during the transaction.

The invention is based on the principle that all the media distributed to the persons for allowing them to be identified or for storing personal data, have an identifier which ensures their uniqueness.

Consequently, it is possible to extend the present invention to other systems. Thus, as illustrated in FIG. 2, it is possible to apply the method with a system 110 and a computer program product 112.

Figure 2:
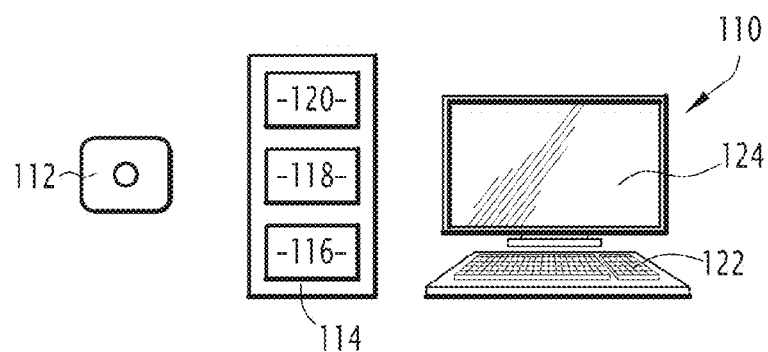
FIG. 2 is a schematic illustration of another example of a system giving the possibility of applying a management method.

The system 110 and the computer program product 112 are illustrated in FIG. 2. The interaction of the computer program product 112 with the system 110 allows application of a method for identifying a relationship between physical elements.

The system 110 is a computer.

More generally, the system 110 is an electronic computer capable of handling and/or transforming data represented as electronic or physical quantities in registers of the system 110 and/or memories in other similar data corresponding to physical data in memories, registers or other types of display, transmission or memory-storage devices.

The system 110 includes a processor 114 comprising a data processing unit 116, memories 118 and a reader 120 of an information medium. The system 110 also comprises a keyboard 122 and a display unit 124.

The computer program product 112 includes a legible information medium 120.

A legible information medium 120 is a medium which is legible by the system 110, usually by the data processing unit 114. The legible information medium 120 is a medium adapted for storing in memory electronic instructions and capable of being coupled with a bus of a computer system.

As an example, the legible information medium 120 is a diskette or floppy disk, an optical disk, a CD-ROM, a magneto-optical disk, a ROM memory, a RAM memory, an EPROM memory, an EEPROM memory, a magnetic card or an optical card.

On the legible information medium 20 is stored in memory a computer program comprising program instructions.

The computer program is loadable on the data processing unit 114 and is adapted for causing application of a method for identifying a relationship between physical elements when the computer program is applied on the data processing unit 114.

The invention claimed is:

1. A method for managing access rights of a user to a place, the method being applied by an automaton including a readout unit, the method comprising:

presenting, to the readout unit, a physical medium for identification, the physical medium including first data and second data, the first data corresponding to a first layer and the second data corresponding to a second layer, the second layer being an application layer, the first layer being a layer of a lower level than the second layer, and the first data including an identification code;

sending, by the readout unit to the physical medium, one or more messages requesting provision of the identification code, and each message of said one or more messages being addressed to the first layer of the physical medium in accordance with a communication protocol for the first level of the first layer, where in the event that one of said one or more messages does not result in a response from the physical medium, another subsequent one of the one or more messages is subsequently sent by the readout unit to the physical medium, the subsequent one of the one or more messages having a different communication protocol than every previous one of the one or more messages sent by the readout unit; and upon receiving, at the readout unit, a response from the physical medium, the readout unit receives the identification code from the physical medium, wherein each of said one or more messages includes two portions, a second of said two portions being redundant with a first of said two portions, both of said two portions requesting the identification code from the physical medium.

2. The method according to claim 1, wherein, in the sending step, a number of more than or equal to five ones of said one or more messages is sent by the readout unit, each of said messages having a different communication protocol.

3. The method according to claim 1, further comprising:
in the event that no response from the physical medium is received by the readout unit responsive to the one or more messages sent by the readout unit to the physical medium, rejecting the physical medium.

4. The method according to claim 1,
wherein the automaton includes a controller, and
wherein the method further comprises:
transmitting the identification code from the readout unit to the controller;
sending, by the controller, the identification code to a central server in order to recover access data of the user to the place; and
sending access data from the central server to the controller.

5. The method according to claim 1, wherein the automaton is a time-stamp meter.

6. An automaton, comprising:
a readout unit configured to carry out the functions of:
sending, upon presentation of an identification physical medium to the readout unit, one or more messages to the physical medium, each message of said one or more messages including first data and second data, the first data corresponding to a first layer of the physical medium and the second data corresponding to a second layer of the physical medium, the second layer being an application layer, the first layer being a layer of lower level than the second layer, and the first data including an identification code,
each message of said one or more messages being a message for requesting provision of the identification code of the physical medium, and each message of said one or more messages being addressed to the first layer of the physical medium in accordance with a communications protocol for the first level of the first layer,
where in the event that one of said one or more messages does not result in a response from the physical medium, another subsequent one of the one or more messages is subsequently sent by the readout unit to the physical medium, the subsequent one of the one or more messages having a different communication protocol than every previous one of the one or more messages sent by the readout unit; and
upon receiving a response from the physical medium, receiving the identification code from the physical medium,
wherein each of said one or more messages includes two portions, a second of said two portions being redundant with a first of said two portions, both of said two portions requesting the identification code from the physical medium.

7. The automaton according to claim 6, wherein the automaton is a time-stamp meter.

8. A management system, comprising:
a central server in communication with an automaton according to claim 6,
wherein the automaton includes a controller configured to receive the identification code from the readout unit and to send the identification code by the controller to a central server for recovering access rights of the user to the place.

9. A computer program product including a computer-readable information medium, on which is stored a computer program comprising program instructions, the computer program being loadable by a data processing unit and, upon execution by the data processing unit, causes the data processing unit to execute the steps of the method according to claim 1.

* * * * *